Figure 1:
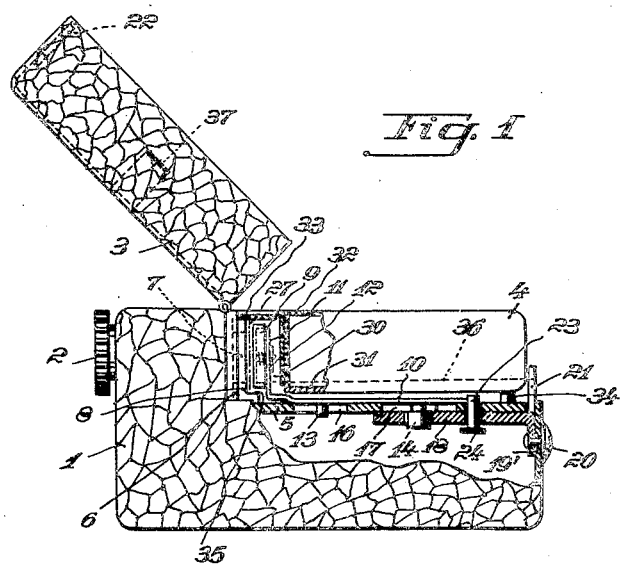

Nov. 28, 1933.　　　　K. MORSBACH　　　　1,937,354
MOTION PICTURE CAMERA AND FILM CONTAINER ADAPTED
TO BE INSERTED INTO SUCH CAMERAS
Filed July 23, 1932

INVENTOR
KURT MORSBACH
BY
ATTORNEYS.

Patented Nov. 28, 1933

1,937,354

UNITED STATES PATENT OFFICE 1,937,354

MOTION-PICTURE CAMERA AND FILM CONTAINER ADAPTED TO BE INSERTED INTO SUCH CAMERAS

Kurt Morsbach, Berlin-Grunewald, Germany, assignor to Siemens & Halske, Aktiengesellschaft, Siemensstadt, near Berlin, Germany, a corporation of Germany Application July 23, 1932, Serial No. 624,170, and in Germany July 25, 1931

10 Claims. (Cl. 88—17)

My invention relates to motion-picture cameras and film containers adapted to be inserted into such cameras. The film container or magazine houses the so-called take-up spool, driven by the camera driving mechanism, upon which the film is wound, and the so-called supply spool from which the film is drawn off by the intermittent film feed mechanism. Between the two spools runs the film for exposure along a longer or shorter portion outside the film container across the exposure opening or film window of the camera. This portion of the film extending from the container is guided in a film channel or guideway containing the film exposure opening or window. The threading of the piece of film running freely out of the container into the film guideway or channel causes considerable difficulties in many cameras.

My invention consists more particularly in letting the film pass along behind an aperture or opening in the container and to provide in the rear of said opening a presser-plate which together with the guide face of the exposure opening forms a film channel or guideway. There are, furthermore, provided means for securely holding the film container or magazine in place within the case of the camera so that the film is accurately guided across the front of the exposure opening or window.

One object of my invention is to arrange the presser-plate opposite the guide face with the exposure opening or window within the camera and to provide in the container a cavity, recess or aperture across which the film runs in a substantially straight line, so that on inserting the container or magazine into the camera the presser-plate engages this recess or aperture and the film thus automatically passes into the guide way or film channel.

Another object of my invention is to arrange the said presser-plate slidably within the camera, and in such a manner that after the insertion of the film container into the case of the camera the plate is able to press the film against the guiding face, for closing the film channel or guideway without the film substantially changing its position. The presser plate is yieldingly mounted on a plate or rail, which is adapted to slide along a partition wall located within the camera. The displacement of the plate or rail may be effected directly by hand or, for instance, by a closing member of the camera.

A further object of my invention is to provide guide members at the film channel or guideway for guiding the film along its edges. One of these lateral guides may be formed by a plate projecting across the aperture, recess or depression of the film container, which then rests upon a corresponding face at the film channel or guideway so that in this way the channel is laterally confined at one side. The other lateral guide is formed by an opposite face disposed vertically to the guide face of the channel or guideway, against which the film abuts when inserting the film container into the camera, so that the position of the film in relation to the window is definitely determined.

A still further object of my invention is to adapt one of these guides as rest or abutment for the container by, as already pointed out, the container supporting itself with one abutment face, which serves for the lateral guidance of the film, against the film channel, and providing further points of support, which together with the first named complete a three-point contact.

The height of the supporting members above the partition wall of the camera is so chosen that the plate or rail, by means of which the presser-plate for closing the film channel can be displaced, is freely movable.

Figure 2:
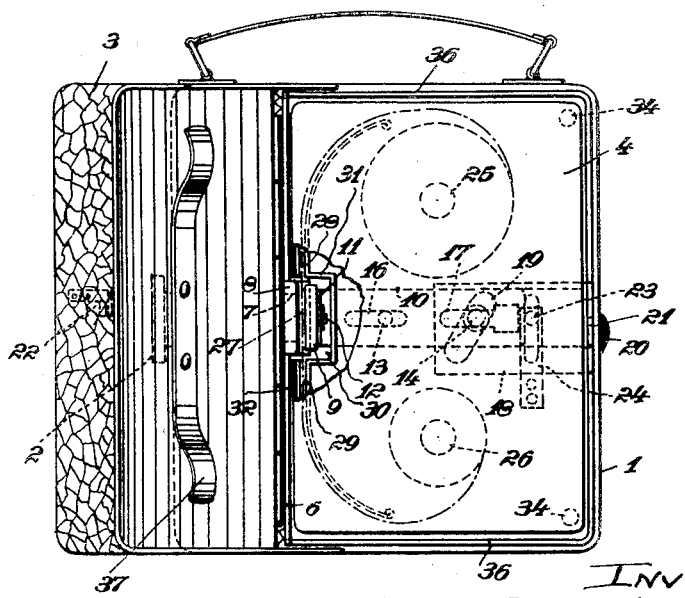

An embodiment of my invention is illustrated by way of example in the drawing affixed to my specification and forming part thereof, and will now be described in detail. In the drawing:

Fig. 1 shows a motion-picture camera with the compartment for housing the film container or magazine open, in sectional elevation, and Fig. 2, another view of the camera, likewise with the cover open.

At the front wall of a motion-picture camera 1 there is located the objective 2 for taking the photographs. The camera is adapted to be opened at one side by means of a cover 3 hinged to the casing which when opened renders the charging compartment for the film container 4 accessible for inspection. The charging compartment is separated from the compartment for the clockwork driving the film feed mechanism by a partition wall 5. Towards the side of the objective the charging compartment is confined by a transverse wall 6 on which is located a guide face 8 containing the exposure opening or film window 7. This guide face together with a presser-plate 9 forms the film channel or guideway. The presser-plate is secured to a plate or rail 10 by means of a rectangularly bent-off portion 11 and a yieldingly mounted pin 12. The rail or plate 10 is guided on the partition wall 5 by means of pins 13 and 14 located in longitudinal openings or slots 16 and 17.

The guide pin 14 extends with a portion of larger diameter through a plate 18 located at the other side of the partition wall 5 and provided with an oblique slot 19. The plate 18 is provided with a portion 19' bent off at a right angle and engaged by the locking knob or button 20, located outside the casing of the camera and extending through the wall thereof. The plate 18 also carries the latch or catch 21 adapted to engage a corresponding member 22 of the cover or lid 3 after the charging compartment has been closed by the cover. By pushing the button 20 sideways in one direction or the other the plate 18 is moved correspondingly, so that by means of the oblique control slot 19' engaging the pin 14 the rail or plate 10 can be moved forwards or backwards in the direction of the optical axis of the camera. The closing movement of the camera corresponds with a forward motion of the rail or plate 10 and thus the closing of the film channel or guideway, while on opening the lock by the latch 21 the film channel is opened. The opening movement of the rail or plate 10 is limited by a stop pin 23. The pin 23 is held in working position by a flat spring 24 secured to the partition wall 5. By depressing the pin 23 the rail or plate 10 can be moved further back, after the film container 4 has been lifted out of the casing of the camera, and then be removed from the guide slots 16, 17, 19', a suitably enlarged portion in the slot 17 being provided for lifting the rail or plate off the broadened portions of the pin 14 serving as guides.

In the film container 4 there is accommodated a reel or spool 25 upon which is wound up the supply of film and a spool or reel 26 for taking up the exposed film.

For exposing the film a piece of film 27 is freely drawn out of the film container and passed through film channels or guideways 28, 29. This portion of the film is located in front of an aperture or a cavity or recess 30 of substantially rectangular cross-section into which projects the presser-plate 9 when the film container or magazine is placed into the camera. The film container or magazine consists of a bottom portion 31 and a cover portion 32. The surface of the cover portion 32 extends beyond the recess 30 and thus forms a supporting face 33 by means of which the container, when inserted into the charging compartment, supports itself laterally, on a corresponding face of the portion 8 of the exposure opening. The film container rests at the same time upon pins 34 disposed in opposite corners of the charging compartment on the partition wall 5.

The supporting face 33 confines the film channel sideways so that the film is accurately guided in front of the exposure opening or window 7. The lateral confinement of the film channel or guideway at the other side is formed by a face 35 likewise disposed at right angles to the guide face 8. As the camera is held substantially in a horizontal position when inserting the film container into the casing of the camera and the container is prevented from slipping out sideways by upstanding edges 36 of the charging compartment the position of the container is definitely fixed, and in consequence of the lateral confinement of the film channel also the position of the film in front of the exposure opening or film window. When closing the cover 3 a flat spring 37 mounted inside the cover places itself on the film container so that the container is unable to slide towards one side when the position of the camera is changed.

By moving the button or knob 20 sideways the cover 3 is locked and simultaneously the film channel closed and thus the plane of the film brought into accord with the focusing plane of the objective.

Although I have only shown and described a preferred embodiment of my invention, it will be readily understood that I do not limit myself to this construction, and that various structural alterations may be made within the appended claims.

What I claim as new and desire to secure by Letters Patent is:

1. The combination of a motion-picture camera and a film container, said camera having a charging compartment adapted to receive the film container, and an exposure opening across which the film to be exposed is fed, and two film guiding surfaces located in proximity to the exposure opening and adapted, when the film container is inserted in said compartment, to engage the opposite side edges of the film for positioning the latter in registry with said exposure opening as said film is fed across the same, one of said film guiding surfaces being located on the film container and the other on said camera.

2. The combination of a motion-picture camera and a film container, said camera having a charging compartment adapted to receive the film container, and an exposure opening across which the film to be exposed is fed, bearing surfaces adapted to be spanned by the film container in said charging compartment for supporting said film container therein, one of said bearing surfaces being located in proximity to the exposure opening, and two film guiding surfaces located in proximity to said exposure opening and adapted, when the film container is inserted in said compartment, to engage the opposite side edges of the film for positioning the latter in registry with said exposure opening as said film is fed across the same, one of said film guiding surfaces being located on the film container and the other on said camera.

3. The combination of a motion-picture camera and a film container, said camera having a charging compartment adapted to receive the film container, and an exposure opening across which the film to be exposed is fed, three bearing surfaces adapted to be spanned by the film container in said charging compartment for supporting said film container therein, one of said surfaces being located in proximity to the exposure opening and the other two bearing surfaces being located in the corners of the camera lying opposite to the exposure opening, and two film guiding surfaces located in proximity to the exposure opening and adapted, when the film container is inserted in said compartment, to engage the opposite side edges of the film for positioning the latter in registry with said exposure opening as said film is fed across the same, one of said film guiding surfaces being located on the film container and the other on said camera.

4. The combination of a motion-picture camera and a film container, said camera having a charging compartment adapted to receive the film container, and an exposure opening across which the film to be exposed is fed, bearing surfaces adapted to be spanned by the film container in said charging compartment for supporting said film container therein, one of said bearing surfaces being located above the exposure opening, and two film guiding surfaces located in proximity to the exposure opening and adapted, when the film container is inserted in said compartment, to engage the opposite side edges of the film for positioning the latter in registry with said exposure opening as said film is fed across the same, one of said film guiding surfaces being located on the film container and the other on said camera.

5. The combination of a motion-picture camera and a film container, said camera having a charging compartment adapted to receive the film container, and an exposure opening across which the film to be exposed is fed, a frame surrounding said exposure opening, bearing surfaces adapted to be spanned by the film container in said compartment for supporting the film container therein, one of these bearing surfaces being formed on the upper edge of said frame, and two film guiding surfaces located in proximity to the exposure opening and adapted, when the film container is inserted in said compartment, to engage the opposite side edges of the film for positioning the latter in registry with said exposure opening as said film is fed across the same, one of said film guiding surfaces being located on the film container and the other on said camera.

6. The combination of a motion-picture camera having an exposure opening and a charging compartment, and a film container having a recess located opposite a wall of said compartment, a member on said film container projecting over said wall of said compartment, bearing surfaces adapted to be spanned by the film container in said compartment, one of said bearing surfaces being located in proximity to the exposure opening and co-operating with said member to support said film container, and two film guiding surfaces located in proximity to the exposure opening and adapted, when the film container is inserted in said compartment, to engage the opposite side edges of the film for positioning the latter in registry with said exposure opening, the one of said film guiding surfaces being formed on said member and the other being located on said camera.

7. The combination of a motion-picture camera having an exposure opening and a charging compartment, and a film container having a recess located opposite a wall of said compartment, a member on said film container projecting over said wall of said compartment, bearing surfaces adapted to be spanned by the film container in said compartment, one of said bearing surfaces being located in proximity to the exposure opening and co-operating with said member to support said film container, and two film guiding surfaces located in proximity to the exposure opening and adapted, when the film container is inserted in said compartment, to engage the opposite side edges of the film for positioning the latter in registry with said exposure opening, the one of said film guiding surfaces being formed on said member and the other being located on said camera, and that portion of said member which engages the co-operating bearing surface and the film guiding surface of said member being located in the same plane.

8. The combination of a motion-picture camera having an exposure opening and a charging compartment, and a film container having a recess located opposite a wall of said compartment, a frame surrounding said exposure opening, a ledge below the exposure opening projecting over said frame, a member on said film container projecting over said wall of said compartment, bearing surfaces adapted to be spanned by the film container in said compartment, one of said bearing surfaces being formed on the upper edge of said frame and co-operating with said member to support said film container, and two film guiding surfaces located in proximity to the exposure opening and adapted, when the film container is inserted in said compartment, to engage the opposite edges of the film for positioning the latter in registry with said exposure opening, the one of these film guiding surfaces being formed on said member and the other being formed on said ledge.

9. A combined motion-picture camera and film container as set forth in claim 13 and including resilient means arranged to resiliently press the film container against the bearing surfaces.

10. A combined motion-picture camera and film carrier as set forth in claim 13 and including a cover for closing the charging compartment, and a spring on the inner surface of said cover arranged to hold the film container against the bearing surfaces in said compartment.

KURT MORSBACH.

CERTIFICATE OF CORRECTION.

Patent No. 1,937,354.   November 28, 1933.

KURT MORSBACH.

It is hereby certified that error appears in the printed specification of the above numbered patent requiring correction as follows: Page 3, lines 117 and 121, claims 9 and 10, respectively, for the claim number "13" read 2; and that the said Letters Patent should be read with these corrections therein that the same may conform to the record of the case in the Patent Office.

Signed and sealed this 26th day of December, A. D. 1933.

Richard Spencer (Seal)   Acting Commissioner of Patents.